(12) United States Patent
Kalman et al.

(10) Patent No.: US 9,578,074 B2
(45) Date of Patent: Feb. 21, 2017

(54) ADAPTIVE CONTENT TRANSMISSION

(71) Applicant: Amazon Technologies, Inc., Reno, NV (US)

(72) Inventors: Mark Kalman, San Francisco, CA (US); Scott Wright Heath, Berkeley, CA (US); Gerard Joseph Heinz, II, Seattle, WA (US); Keith Emery Belovay, Seattle, WA (US); Vinod Murli Mamtani, Bellevue, WA (US); Bin Wang, Alameda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 14/077,084

(22) Filed: Nov. 11, 2013

(65) Prior Publication Data
US 2015/0134771 A1    May 14, 2015

(51) Int. Cl.
*H04L 1/00*       (2006.01)
*H04L 29/06*      (2006.01)

(52) U.S. Cl.
CPC .......... *H04L 65/4069* (2013.01); *H04L 1/004* (2013.01); *H04L 1/0009* (2013.01)

(58) Field of Classification Search
CPC ........ H04H 60/41; H04H 60/80; H04H 20/42; H04H 20/12; H04H 20/26; H04H 20/40; H04H 20/423; H04H 20/426; H04H 60/07; H04H 60/51; H04H 20/78; H04H 20/77; H04N 21/6377; H04N 21/658; H04N 7/17309; H04N 21/2221; H04N 21/2408; H04N 21/632; H04N 21/2365; A63F 13/12; A63F 2300/407; H04W 4/18; H04W 52/20
See application file for complete search history.

(56) References Cited

U.S. PATENT DOCUMENTS

| | | | |
|---|---|---|---|
| 5,774,668 | A | 6/1998 | Choquier et al. |
| 5,956,489 | A | 9/1999 | San Andres et al. |
| 6,343,313 | B1 | 1/2002 | Salesky et al. |
| 6,525,731 | B1 | 2/2003 | Suits et al. |
| 6,556,206 | B1 | 4/2003 | Benson et al. |
| 6,694,346 | B1 | 2/2004 | Aman et al. |

(Continued)

FOREIGN PATENT DOCUMENTS

WO    WO 2013/069654 A1    5/2013

OTHER PUBLICATIONS

U.S. Appl. No. 14/317,441, filed Jun. 27, 2014, Kalman et al.

(Continued)

*Primary Examiner* — Sargon Nano
(74) *Attorney, Agent, or Firm* — Baker & Hostetler LLP

(57) ABSTRACT

Techniques for adaptive content transmission are described herein. During transmission of a content item, a network connection may be monitored to collect data corresponding to one or more network conditions associated with the transmission of the content item. Such network conditions may include, for example, network throughput, available network bandwidth, network latency and others. The collected data may be used to dynamically adjust one or more transmission attributes in connection with the transmitted content item. The one or more transmission attributes may be determined for adjustment at any desired transmission interval.

26 Claims, 8 Drawing Sheets

(56) References Cited

U.S. PATENT DOCUMENTS

| | | | |
|---|---|---|---|
| 6,941,078 B1* | 9/2005 | Onaka | H04B 10/5051 398/155 |
| 7,068,729 B2 | 6/2006 | Shokrollahi et al. | |
| 7,177,448 B1 | 2/2007 | Sah | |
| 7,249,291 B2 | 7/2007 | Rasmussen et al. | |
| 7,447,235 B2 | 11/2008 | Luby et al. | |
| 7,522,167 B1 | 4/2009 | Diard et al. | |
| 7,548,242 B1 | 6/2009 | Hughes et al. | |
| 7,616,206 B1 | 11/2009 | Danilak | |
| 7,616,207 B1 | 11/2009 | Diard et al. | |
| 7,623,131 B1 | 11/2009 | Johnson | |
| 7,660,245 B1 | 2/2010 | Luby | |
| 7,711,068 B2 | 5/2010 | Shokrollahi et al. | |
| 7,720,174 B2 | 5/2010 | Shokrollahi et al. | |
| 7,721,184 B2 | 5/2010 | Luby et al. | |
| 7,956,772 B2 | 6/2011 | Shokrollahi et al. | |
| 7,969,444 B1 | 6/2011 | Biermann et al. | |
| 7,984,179 B1 | 7/2011 | Huang | |
| 8,065,676 B1 | 11/2011 | Sahai et al. | |
| 8,185,809 B2 | 5/2012 | Luby et al. | |
| 8,190,760 B2 | 5/2012 | Hurst et al. | |
| 8,279,755 B2 | 10/2012 | Luby | |
| 8,458,567 B2 | 6/2013 | Luby et al. | |
| 8,473,557 B2 | 6/2013 | Ramakrishnan et al. | |
| 8,478,816 B2 | 7/2013 | Parks et al. | |
| 8,484,284 B2 | 7/2013 | Elliott et al. | |
| 8,527,646 B2 | 9/2013 | Khatib et al. | |
| 8,572,251 B2 | 10/2013 | Srinivas et al. | |
| 8,671,163 B2 | 3/2014 | Luby et al. | |
| 8,838,722 B2* | 9/2014 | Ridges | H04N 21/41407 709/204 |
| 8,928,659 B2 | 1/2015 | Bar-Zeev et al. | |
| 8,996,864 B2 | 3/2015 | Maigne et al. | |
| 9,192,859 B2* | 11/2015 | Perlman | A63F 13/12 |
| 2002/0114404 A1* | 8/2002 | Aizawa | H04L 1/1819 375/295 |
| 2002/0129159 A1 | 9/2002 | Luby et al. | |
| 2002/0147611 A1 | 10/2002 | Greene et al. | |
| 2002/0173984 A1 | 11/2002 | Robertson et al. | |
| 2002/0176367 A1 | 11/2002 | Gross | |
| 2003/0091000 A1 | 5/2003 | Chu et al. | |
| 2003/0105925 A1 | 6/2003 | Yoshimura et al. | |
| 2003/0212742 A1 | 11/2003 | Hochmuth et al. | |
| 2004/0057379 A1 | 3/2004 | Chen et al. | |
| 2004/0073903 A1 | 4/2004 | Melchione et al. | |
| 2004/0093206 A1* | 5/2004 | Hardwick | G10L 19/087 704/221 |
| 2004/0098748 A1 | 5/2004 | Bo et al. | |
| 2004/0101274 A1 | 5/2004 | Foisy et al. | |
| 2004/0153316 A1* | 8/2004 | Hardwick | G10L 19/173 704/214 |
| 2005/0135305 A1 | 6/2005 | Wentink | |
| 2006/0036756 A1 | 2/2006 | Driemeyer et al. | |
| 2006/0061651 A1 | 3/2006 | Tetterington | |
| 2006/0072831 A1 | 4/2006 | Pallister | |
| 2006/0088093 A1* | 4/2006 | Lakaniemi | G10L 19/005 375/240.01 |
| 2006/0168147 A1 | 7/2006 | Inoue et al. | |
| 2007/0009043 A1 | 1/2007 | Craig et al. | |
| 2007/0053692 A1* | 3/2007 | Hoshida | H04B 10/2916 398/97 |
| 2007/0094094 A1 | 4/2007 | Yaron et al. | |
| 2007/0140359 A1* | 6/2007 | Ehret | H04L 1/0083 375/246 |
| 2007/0156725 A1* | 7/2007 | Ehret | G10L 19/167 |
| 2007/0183493 A1 | 8/2007 | Kimpe | |
| 2007/0226364 A1 | 9/2007 | Landspurg | |
| 2007/0265073 A1 | 11/2007 | Novi et al. | |
| 2008/0008093 A1 | 1/2008 | Wang et al. | |
| 2008/0104608 A1 | 5/2008 | Hyser et al. | |
| 2008/0172140 A1 | 7/2008 | Kim et al. | |
| 2008/0281793 A1 | 11/2008 | Mathur | |
| 2009/0131177 A1 | 5/2009 | Pearce | |
| 2009/0150750 A1* | 6/2009 | Liu | H04L 1/0052 714/758 |
| 2009/0195537 A1 | 8/2009 | Qiu et al. | |
| 2009/0245426 A1* | 10/2009 | Ratnakar | H04L 1/0045 375/327 |
| 2009/0249440 A1 | 10/2009 | Platt et al. | |
| 2009/0251488 A1 | 10/2009 | Clavel | |
| 2009/0307565 A1 | 12/2009 | Luby et al. | |
| 2010/0017686 A1 | 1/2010 | Luby et al. | |
| 2010/0063992 A1 | 3/2010 | Ma et al. | |
| 2010/0088453 A1 | 4/2010 | Solki et al. | |
| 2010/0156892 A1 | 6/2010 | Chan et al. | |
| 2010/0166058 A1 | 7/2010 | Perlman et al. | |
| 2010/0166063 A1 | 7/2010 | Perlman et al. | |
| 2010/0166065 A1 | 7/2010 | Perlman et al. | |
| 2010/0166068 A1 | 7/2010 | Perlman et al. | |
| 2010/0289803 A1 | 11/2010 | Klosowski et al. | |
| 2010/0312891 A1 | 12/2010 | Pairault et al. | |
| 2011/0002377 A1* | 1/2011 | Raveendran | H04H 20/42 375/240.01 |
| 2011/0002378 A1* | 1/2011 | Raveendran | H04H 20/40 375/240.01 |
| 2011/0002379 A1* | 1/2011 | Raveendran | H04H 20/42 375/240.01 |
| 2011/0002399 A1* | 1/2011 | Raveendran | H04H 20/42 375/240.28 |
| 2011/0002405 A1* | 1/2011 | Raveendran | H04H 60/41 375/260 |
| 2011/0040894 A1 | 2/2011 | Shrum et al. | |
| 2011/0055372 A1 | 3/2011 | Elyashev et al. | |
| 2011/0055602 A1 | 3/2011 | Kamay et al. | |
| 2011/0125746 A1 | 5/2011 | Leary et al. | |
| 2011/0134111 A1 | 6/2011 | Stone | |
| 2011/0157193 A1 | 6/2011 | Boucher et al. | |
| 2011/0252181 A1 | 10/2011 | Ouye et al. | |
| 2011/0252356 A1 | 10/2011 | Morris | |
| 2011/0276689 A1 | 11/2011 | Rosen | |
| 2011/0283045 A1 | 11/2011 | Krishnan et al. | |
| 2011/0304634 A1 | 12/2011 | Urbach | |
| 2012/0004040 A1 | 1/2012 | Pereira et al. | |
| 2012/0004041 A1 | 1/2012 | Pereira et al. | |
| 2012/0004042 A1 | 1/2012 | Perry et al. | |
| 2012/0005316 A1* | 1/2012 | Perry | H04L 65/4069 709/219 |
| 2012/0069036 A1 | 3/2012 | Dharmapurikar | |
| 2012/0084774 A1 | 4/2012 | Post et al. | |
| 2012/0089980 A1 | 4/2012 | Sharp et al. | |
| 2012/0093252 A1 | 4/2012 | Strait | |
| 2012/0117145 A1 | 5/2012 | Clift et al. | |
| 2012/0141089 A1 | 6/2012 | Hunt | |
| 2012/0173715 A1 | 7/2012 | Selitser et al. | |
| 2012/0182387 A1 | 7/2012 | Enenkl et al. | |
| 2012/0188341 A1 | 7/2012 | Klein et al. | |
| 2012/0192031 A1* | 7/2012 | Liu | H04L 1/007 714/752 |
| 2012/0206572 A1 | 8/2012 | Russell | |
| 2012/0209933 A1* | 8/2012 | Ridges | H04L 65/403 709/208 |
| 2012/0224490 A1 | 9/2012 | Ikada | |
| 2012/0268553 A1 | 10/2012 | Talukder | |
| 2012/0281962 A1 | 11/2012 | Hunt et al. | |
| 2012/0331147 A1 | 12/2012 | Dutta et al. | |
| 2013/0007499 A1 | 1/2013 | Moy | |
| 2013/0016107 A1 | 1/2013 | Dharmapurikar | |
| 2013/0024812 A1 | 1/2013 | Reeves et al. | |
| 2013/0031161 A1 | 1/2013 | Yang | |
| 2013/0036476 A1 | 2/2013 | Roever et al. | |
| 2013/0038618 A1 | 2/2013 | Urbach | |
| 2013/0106855 A1 | 5/2013 | Urbach | |
| 2013/0151683 A1 | 6/2013 | Jain et al. | |
| 2013/0151803 A1 | 6/2013 | Tofano | |
| 2013/0210522 A1 | 8/2013 | Dharmapurikar | |
| 2013/0322517 A1 | 12/2013 | Zurpal et al. | |
| 2013/0326024 A1 | 12/2013 | Chen et al. | |
| 2013/0344960 A1 | 12/2013 | Perry et al. | |
| 2013/0344961 A1 | 12/2013 | Iannetta | |
| 2013/0344966 A1 | 12/2013 | Mustafa | |
| 2014/0025710 A1 | 1/2014 | Sarto | |

(56) References Cited

U.S. PATENT DOCUMENTS

| | | |
|---|---|---|
| 2014/0108967 A1 | 4/2014 | Markham et al. |
| 2014/0143301 A1 | 5/2014 | Watson et al. |
| 2014/0173060 A1 | 6/2014 | Jubran et al. |
| 2014/0173674 A1 | 6/2014 | Wolman et al. |
| 2014/0176583 A1 | 6/2014 | Abiezzi et al. |
| 2014/0267283 A1 | 9/2014 | Nystad et al. |
| 2014/0279581 A1 | 9/2014 | Devereaux et al. |
| 2014/0297798 A1 | 10/2014 | Bakalash et al. |
| 2014/0337835 A1 | 11/2014 | Johnson |
| 2015/0019965 A1 | 1/2015 | Roberts et al. |
| 2015/0084981 A1 | 3/2015 | Clarberg |
| 2015/0091903 A1 | 4/2015 | Costello et al. |
| 2015/0130789 A1 | 5/2015 | Heinz et al. |
| 2015/0130813 A1 | 5/2015 | Taraki et al. |
| 2015/0130814 A1 | 5/2015 | Taraki et al. |
| 2015/0130815 A1 | 5/2015 | Taraki et al. |
| 2015/0131969 A1 | 5/2015 | Taraki et al. |
| 2015/0133214 A1 | 5/2015 | Heath et al. |
| 2015/0133215 A1 | 5/2015 | Heinz et al. |
| 2015/0133216 A1 | 5/2015 | Heinz et al. |
| 2015/0134770 A1 | 5/2015 | Heinz et al. |
| 2015/0134772 A1 | 5/2015 | Heinz et al. |
| 2015/0134779 A1 | 5/2015 | Thompson et al. |
| 2015/0134840 A1 | 5/2015 | Thompson et al. |
| 2015/0142925 A1 | 5/2015 | Hix et al. |
| 2015/0200983 A1 | 7/2015 | Pearce et al. |
| 2015/0249623 A1 | 9/2015 | Phillips et al. |
| 2015/0331813 A1 | 11/2015 | Perrin et al. |

OTHER PUBLICATIONS http://commons.wikimedia.org/wiki/File:Stereoscopic_3D_render_from_Blender.jpg; File: Stereoscopic 3D render from Blender.jpg; Wikimedia; Mar. 4, 2012; accessed Nov. 12, 2013; 2 pages.

http://en.wikipedia.org/wiki/Mipmap; Mipmap; Wikipedia; Oct. 29, 2013; accessed Nov. 10, 2013; 3 pages.

http://en.wikipedia.org/wiki/Texture_atlas; Texture atlas; Wikipedia; Sep. 28, 2013; accessed Nov. 10, 2013; 2 pages.

http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

* cited by examiner

ADAPTIVE CONTENT TRANSMISSION

CROSS REFERENCE TO RELATED APPLICATIONS

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/076,815 filed Nov. 11, 2013, entitled "LOCATION OF ACTOR RESOURCES"; U.S. patent application Ser. No. 14/077,146 filed Nov. 11, 2013, entitled "SESSION IDLE OPTIMIZATION FOR STREAMING SERVER"; U.S. patent application Ser. No. 14/077,023 filed Nov. 11, 2013, entitled "APPLICATION STREAMING SERVICE"; U.S. Patent Application No. 61/902,740 filed Nov. 11, 2013, entitled "EFFICIENT BANDWIDTH ESTIMATION".

BACKGROUND

Recent technological advances have improved the ability to transmit and deliver information in a fast and efficient manner. In accordance with such advances, it is becoming increasingly popular to acquire and store data at a central provider location and to deliver the data to end users quickly upon request. This model may employ technological concepts, such as streaming, in which content may be constantly received by and presented to an end user while being delivered by a provider. One rapidly expanding area is the use of streaming technology to deliver content, such as video games. When streaming content, a provider may access the requested content, render the content from scenes into images, and then encode and transmit the images to a client over a network, such as the Internet.

While streaming and other content delivery technology provides many benefits, any model that relies on transmission of data across a network may necessarily be subject to at least some of the drawbacks associated with network communications. Such drawbacks may include, for example, reductions in network throughput, reductions in available network bandwidth, increases in a loss rate such as a packet loss rate, increases in network latency and others. In particular, the term throughput, as used herein, refers to a proportion of transmitted data that is successfully received. Some techniques have been developed for transmitting data in such a manner as to increase the throughput and/or reduce a loss rate of the transmitted data. In particular, a technique known as forward error correction may involve coding of transmitted data using an error correcting code to include both source bits and additional redundant bits that may be used, for example, to detect and correct errors occurring during the transmission process.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
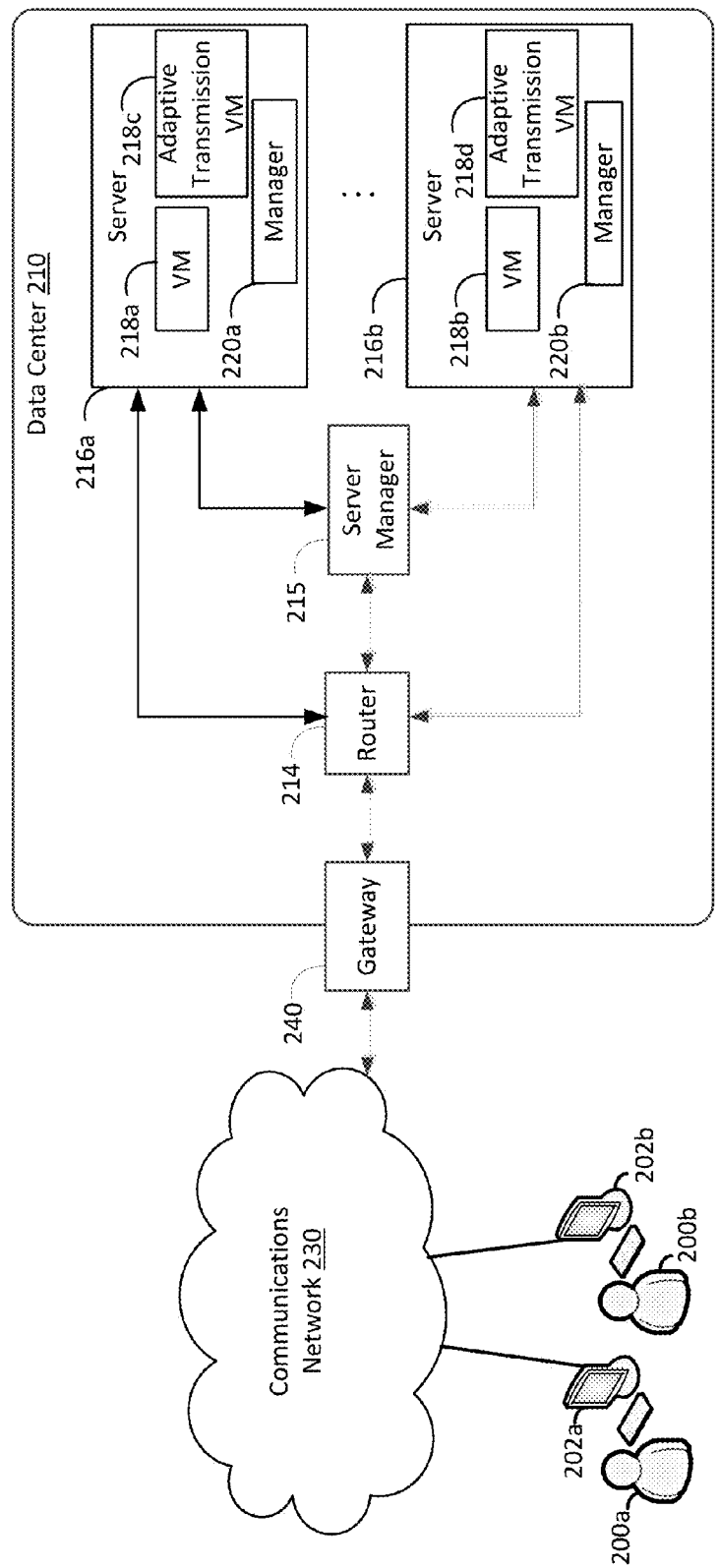
FIG. 1 is a diagram illustrating an example computing system that may be used in some embodiments.

In general, this disclosure describes techniques for adaptive content transmission. In accordance with the disclosed techniques, a content item such as a video game may be transmitted from a content provider to a client device using an electronic network such as the Internet. During the transmission of the content item, the content provider may monitor the network connection to the client to collect data corresponding to one or more network conditions associated with the transmission of the content item. Such network conditions may include, for example, network throughput, available network bandwidth, a loss rate such as a packet loss rate, network latency and others. The content provider may then use the collected data to dynamically adjust a proportion of forward error correction applied in connection with the transmitted content item. The applied proportion of forward error correction may be determined for adjustment at any desired transmission interval. For example, in some cases, the applied proportion of forward error correction may be determined for adjustment on a frame-by-frame basis or in intervals of a plurality of frames.

In some cases, as an alternative or in addition to network conditions, the applied proportion of forward error correction may be adjusted based, at least in part, on one or more transmission attributes. For example, in some cases the applied proportion of forward error correction may be adjusted based on transmission attributes such as an encoding bitrate of the transmitted data, a resolution of the transmitted data, frame rate of the transmitted data and others. In some cases, one or more transmission attributes such as those listed above may also be dynamically adjusted by the content provider. This dynamic adjustment of transmission attributes may result in a balancing process in which a desired amount of forward error correction is raised or lowered based on one or more other dynamically adjusted transmission attributes. For example, in some cases, when it is determined that the encoding bitrate will be dynamically increased, then the proportion of forward error correction may be dynamically decreased in order to make more bits available for application of the higher encoding bitrate.

A number of other example factors may also be considered in association with the dynamic adjustment of the applied proportion of forward error correction. For example, in some cases, the applied proportion of forward error correction may be adjusted based on one or more transmission protocols employed for transmission of a content item. As another example, the applied proportion of forward error correction may be adjusted based on the identity of the transmitted content item itself or the identity and/or capabilities of the client to which the content item is being transmitted. As yet another example, the applied proportion of forward error correction may be adjusted based on historical transmission information. Such historical transmission information may include, for example, historical associations between applied proportions of forward error correction, encoding bitrates and other transmission attributes and resulting observed throughput, loss rates and other network conditions. Such historical transmission information may also include, for example, historical associations between client satisfaction and applied proportions of forward error correction and other transmission attributes.

As set forth above, in some cases, a content provider may render and transmit content to clients over an electronic network such as the Internet. Content may, in some cases, be provided upon request to clients using, for example, streaming content delivery techniques. An example computing environment that enables rendering and transmission of content to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a-b (which may be referred herein singularly as server 216 or in the plural as servers 216) that provide computing resources. These resources may be available as bare metal resources, or as virtual machine instances 218a-d and (which may be referred herein singularly as virtual machine instance 218 or in the plural as virtual machine instances 218). Virtual machine instances 218c and 218d are adaptive transmission machine instances. The adaptive transmission virtual machine instances 218c and 218d may be configured to perform any portion of the techniques for adaptive content transmission in accordance with the present disclosure and described in detail below. As should be appreciated, while the particular example illustrated in FIG. 1 includes one adaptive transmission virtual machine in each server, this is merely an example. A server may include more than one adaptive transmission virtual machine or may not include any adaptive transmission virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
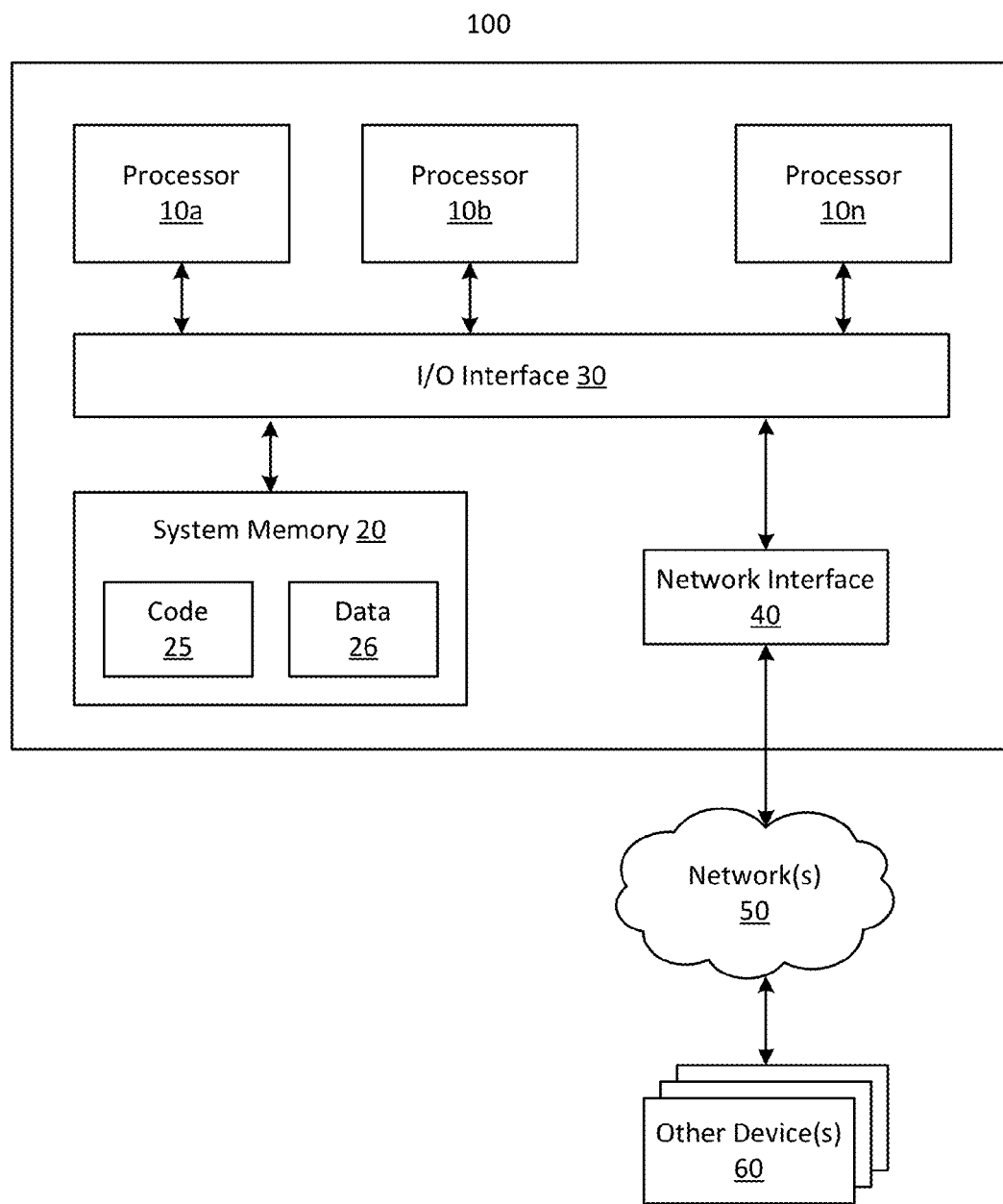
FIG. 2 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10a, 10b and/or 10n (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 100 via I/O interface 30. A non-transitory computer-accessible storage medium may also include any volatile or non-volatile media such as RAM (e.g. SDRAM, DDR SDRAM, RDRAM, SRAM, etc.), ROM etc., that may be included in some embodiments of computing device 100 as system memory 20 or another type of memory. Further, a computer-accessible medium may include transmission media or signals such as electrical, electromagnetic or digital signals conveyed via a communication medium such as a network and/or a wireless link, such as those that may be implemented via network interface 40. Portions or all of multiple computing devices such as those illustrated in FIG. 2 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 3:
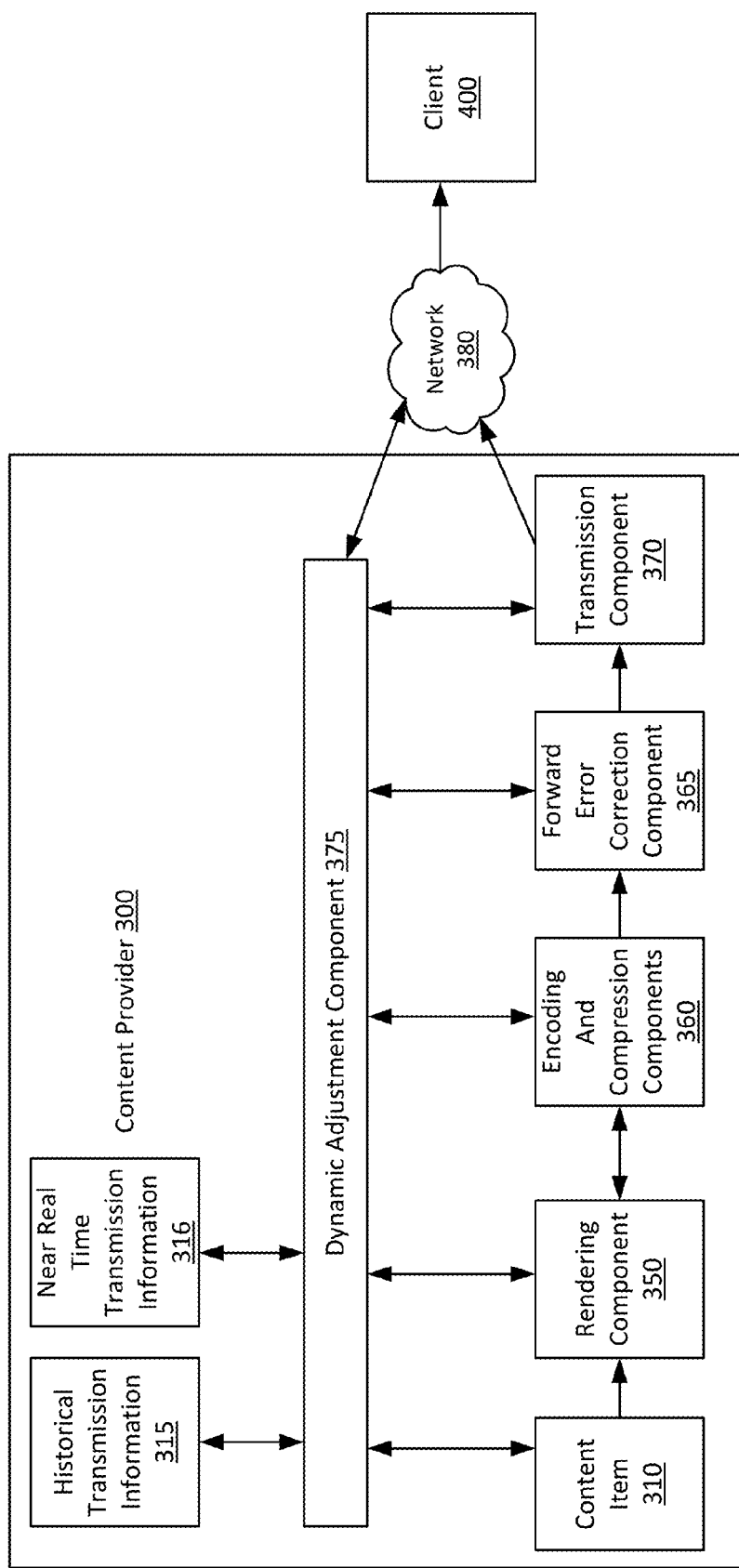
FIG. 3 is a diagram illustrating an example content transmission system in accordance with the present disclosure.

As set forth above, a content item may be transmitted, for example, from a content provider to a client. FIG. 3 is a diagram illustrating an example content transmission system in accordance with the present disclosure. As shown in FIG. 3, content provider 300 and client 400 communicate via network 380, which may, in some cases, be an electronic network such as, for example, the Internet or another type of wide area network (WAN) or local area network (LAN). As set forth above, content may be provided to client 400 by employing, for example, streaming content delivery, in which content may be constantly received by and presented by a destination such as client 400. Content provider 300 may, for example, provide one or more content providing services for providing content to clients such as client 400. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, content provider 300 may determine an "edge" of a system or network associated with content providing services that is physically and/or logically closest to client 400. The content provider 300 may then, for example, "spin-up," migrate resources, or otherwise employ components associated with the determined edge for interacting with the client 400. Such an edge determination process may, in some cases, provide an efficient technique for identifying and employing components that are well suited to interact with a particular client 400, and may, in some embodiments, reduce the latency for communications between a content provider 300 and one or more clients.

As shown in FIG. 3, content item 310, such as a video game, may be delivered from content provider 300 to client 400. The term content, as used herein, refers to any presentable information, and the term content item, as used herein, refers to any collection of any such presentable information. For example, content item 310 may include graphics content such as a video game. In some cases, content item 310 may include two-dimensional content, which, as used herein, refers to content that may be represented in accordance with two-dimensional scenes. Also, in some cases, content item 310 may include three-dimensional content, which, as used herein, refers to content that may be represented in accordance with three-dimensional scenes. The two-dimensional or three-dimensional scenes may be considered logical representations in the sense that they may, for example, not physically occupy the areas that they are intended to logically model or represent. The term scene, as used herein, refers to a representation that may be used in association with generation of an image. A scene may, for example, include or otherwise be associated with information or data that describes the scene.

Information from content item 310 may be provided to a rendering component 350, which may use the information to generate resulting two-dimensional images for transmission to client 400. For example, information regarding content item scenes associated with content item 310 may be provided to rendering component 350. Rendering component 350 may, for example, generate resulting images based on the scene information associated with content item 310. Rendering component 350 may perform well known operations such as lighting, shading, clipping, transformation, scan conversion, rasterization, texturing and fragment shading. Rendering component 350 may include, for example, one or more graphics processing units. Essentially, the output of rendering component 350 may be a two-dimensional image that may be provided to encoding and compression components 360. An image may include, for example, information associated with a displayable output, such as information associated with various pixel values and/or attributes.

Encoding and compression components 360 may encode and compress content images prior to their transmission to client 400. Encoding and compression components 360 may, for example, include an encoder, a compressor, a codec and the like. Encoding and compression components 360 may generally use any appropriate technique to encode and/or compress content images for transmission to client 400.

Encoding and compression components 360 may, for example, apply a particular encoding bitrate for encoding of images. As will be described in greater detail below, in some cases, the encoding bitrate applied to transmitted images may be adjusted dynamically based on information from dynamic adjustment component 375.

Forward error correction component 365 may apply forward error correction techniques to image frames transmitted from content provider 300 to client 400. As set forth above, forward error correction may involve coding of transmitted data using an error correcting code to include both source bits and additional redundant bits that may be used, for example, to detect and correct errors occurring during the transmission process. Forward error correction may, for example, include channel coding techniques. Forward error correction may employ codes such as the Reed-Solomon codes, Raptor codes, Golay codes, Multidimensional parity codes and Hamming codes. In some cases, forward error correction component 365 may apply a particular proportion of forward error correction, which may correspond to a ratio of a number of redundant bits in comparison to a number of source bits. Source bits may include, for example, bits generated by the content item 310 or based on information within the content item 310. As will be described in greater detail below, in some cases, the proportion of forward error correction applied to transmitted image frames may be adjusted dynamically based on information from dynamic adjustment component 375.

After any necessary application of encoding, compression and/or forward error correction, image frames may be transmitted to client 400 by transmission component 370. In some cases, transmission component 370 may include a dedicated respective streaming server associated with client 400. In some cases, such a dedicated respective streaming server may include all or portions of other components such as the encoding and compression components 360 and forward error correction component 365. The use of a dedicated respective streaming server may be advantageous, for example, because it may, in some cases, enable improved ability to adjust various transmission attributes to individual clients based on conditions such as throughput, bandwidth, a loss rate, latency and others with a network connection to each client. It is noted, however, that the disclosed techniques are not limited to the use of dedicated servers for transmission to each client. It is also noted that a dedicated server is not necessarily required to adjust any or all transmission attributes mentioned in the present disclosure. Any number of servers, each for transmission to any number of different clients, may be employed in association with the techniques disclosed herein. Additionally, the disclosed techniques are not limited to the use of streaming technology and may employ other content delivery methods.

Content may be transmitted from content provider 300 to client 400 using any combination of various different protocols. For example, content may be transmitted using either hypertext transfer protocol (HTTP) or non-HTTP protocols. Content may be transmitted using protocols that are considered reliable and protocols that are considered non-reliable. In some cases, content may be transmitted using different transport layer protocols such as transmission control protocol (TCP), user datagram protocol UDP and others.

In some cases, a particular transfer layer protocol that is generally considered to be more reliable, such as TCP protocol, may be employed. However, the use of a protocol that is considered to be more reliable may, in some cases, cause data to be transmitted more slowly than when a less reliable protocol is employed. In some cases, a particular transfer layer protocol that is generally considered to be less reliable, such as UDP protocol, may be employed. However, the use of a protocol that is considered to be less reliable may, in some cases, cause more errors and more lost or missing data to occur during data transmission.

Dynamic adjustment component 375 makes various determinations regarding dynamic adjustment of various transmission attributes including, for example, a proportion of forward error correction applied to the transmitted data, an encoding bitrate of the transmitted data, a resolution of the transmitted data, a frame rate of the transmitted data and various other transmission attributes. As will be described in detail below, in order to assist in performing various determinations, dynamic adjustment component 375 may, for example, directly and/or indirectly monitor, communicate with or otherwise interact with various components and devices such as client 400, network 380, transmission component 370, forward error correction component 365, encoding and compression components 360, rendering component 350, content item 310 and various other components and devices.

As set forth above, dynamic adjustment component 375 may, for example, obtain information corresponding to network conditions associated with a connection from content provider 300 to client 400. The obtained information may correspond to network conditions such as network throughput, available network bandwidth, a loss rate such as packet loss rate, network latency, error rate, distortion rate, packet jitter and various other conditions. In some cases, client 400 may send feedback information to dynamic adjustment component 375 regarding lost packets and the inter-arrival rate of packets. Information regarding lost packets may, for example, include or be used to compute a block error rate. The inter-arrival rates of packets sent in a burst from content provider 300 to the client 400 may, for example, be used to assist in providing an estimate of the available bandwidth. Also, in some cases dynamic adjustment component 375 may estimate bandwidth based on the rate at which content provider 300 is able to push data into particular sockets. Any combination of these example techniques or other available techniques may be employed to gather information corresponding to network conditions.

Dynamic adjustment component 375 may also, for example, obtain information associated with various transmission attributes. For example, dynamic adjustment component 375 may obtain information associated with transmission attributes such as a proportion of forward error correction applied to the transmitted data, an encoding bitrate of the transmitted data, a resolution of the transmitted data, a frame rate of the transmitted data, an amount or complexity of source data being encoded in one or more frames, an amount of change in the contents of source data between frames and others. Dynamic adjustment component 375 may monitor any or all components and/or obtain any or all information at any appropriate intervals including, for example, a frame-by-frame interval or in intervals of a plurality of frames. As should be appreciated, different information may be obtained at different intervals with respect to one another.

In addition to monitoring and obtaining information, dynamic adjustment component 375 may also calculate, determine and send instructions for dynamically adjusting values of various transmission attributes including, for example, an applied proportion of forward error correction, an encoding bitrate of the transmitted data, a resolution of the transmitted data, a frame rate of the transmitted data and others. In many cases, all or some of the dynamically adjusted transmission attributes may be at least partially dependent upon one another. As set forth above, this dynamic adjustment of transmission attributes may result in a balancing process in which, for example, a desired amount of forward error correction is raised or lowered based on one or more other dynamically adjusted transmission attributes. For example, in some cases, when it is determined that the encoding bitrate will be dynamically increased, then the proportion of forward error correction may be dynamically decreased in order to make more bits available for application of the higher encoding bitrate. By contrast, in some cases, when it is determined that the encoding bitrate will be dynamically decreased, then the proportion of forward error correction may be dynamically increased due to more bits being available for application of forward error correction.

In general, dynamically applying a higher proportion of forward error correction may, for example, cause more redundancy. Thus, applying a greater proportion of forward error correction may, in some cases, allow or result in changes such as reductions in encoding bitrate, reductions in resolution and frame rate and others. By contrast, dynamically applying a lower proportion of forward error correction may, for example, cause less redundancy. Thus, applying a lower proportion of forward error correction may, in some cases, allow or result in changes such as increases in encoding bitrate, increases in resolution and frame rate and others. While increasing an applied proportion of forward error correction may sometimes result in an increase in throughput and/or a reduction in a loss rate, the amount of an increase in applied forward error correction may, in some cases, not necessarily be exactly proportional to a resulting increased level of throughput and/or decreased loss rate. For example, a fifty percent increase in the applied proportion of forward error correction may, in some cases, not necessarily result in a fifty percent increase in throughput and/or a fifty percent reduction in a loss rate.

Near real time transmission information 316 may include certain portions of information collected by dynamic adjustment component 375 from, for example, monitoring and communicating with content item 310, components 350, 360, 365 and 370, network 380, client 400 and various other components or entities. Near real time transmission information 316 may also include other information associated with transmission of content. In some cases, certain portions of near real time transmission information 316 may be updated on a periodic basis such as frame-by-frame or another period. However, near real time transmission information 316 need not necessarily be limited or restricted to any particular timeframe or period relative to a current time.

In some cases, dynamic adjustment component 375 may also collect, store, maintain and access historical transmission information 315. Historical transmission information 315 may include, for example, information regarding how prior settings and adjustments to applied proportions of forward error correction, encoding bitrates and other transmission attributes have affected resulting rates of throughput, loss rates and other network conditions for prior transmissions of various content items and clients in various regions. Historical transmission information 315 may, for example, be stored such that it may be aggregated based on various factors such as content items, clients, timeframes, geographic regions and others.

Historical transmission information 315 may also include, for example, client satisfaction information. Client satisfaction information may include, for example, information regarding a duration that a client plays a particular content item. For example, client satisfaction information may indicate that, for one or more prior transmissions of a first content item, clients historically tend to play a first content item for a longer duration when the encoding bitrate is higher and the applied proportion of forward error correction is lower. Thus, on subsequent transmissions of the first content item, dynamic adjustment component 375 may send commands to transmit the first content item using a higher encoding bitrate and a lower applied proportion of forward error correction. By contrast, client satisfaction information may also indicate that, for one or more prior transmissions of a second content item, clients historically tend to play a second content item for a longer duration when the encoding bitrate is lower and the applied proportion of forward error correction is higher. Thus, on subsequent transmissions of the second content item, dynamic adjustment component 375 may send commands to transmit the second content using a lower encoding bitrate and a higher applied proportion of forward error correction.

In some cases, dynamic adjustment component 375 may employ various transmission attribute determination logic for dynamically adjusting various transmission attributes. The transmission attribute determination logic may, for example, be stored by or otherwise provided to dynamic adjustment component 375. The transmission attribute determination logic may, for example, specify various priorities for balancing various transmission attributes. For example, in some cases, the transmission attribute determination logic may indicate that some transmission attributes may have a higher priority than others. For example, the transmission attribute determination logic may indicate that higher proportions of forward error correction are considered to be more important than higher encoding bitrates. By contrast, in some cases, the transmission attribute determination logic may indicate that higher encoding bitrates are considered to be more important than higher proportions of forward error correction. In some cases, various weights may be provided to indicate a relative importance of some transmission attributes in comparison to other transmission attributes.

Also, in some cases, different specified values, ranges of values, and maximum and minimum values may be provided for one or more transmission attributes. For example, in some cases, an acceptable maximum or minimum proportion of forward error correction may be specified. As another example, a particular encoding bitrate or an acceptable range of encoding bitrates may be specified. Also, in some cases, different weights or ratios may be specified for one or more attributes in comparison to one another and to other information associated with the data being transmitted.

In some cases, transmission attribute prioritization logic may vary depending upon factors such as, for example, available bandwidth and latency. For example, when available bandwidth is lower, higher encoding bitrates may, in some cases, be considered more important than higher proportions of forward error correction. By contrast, in some cases, when available bandwidth is higher, higher proportions of forward error correction may, in some cases, be considered more important than higher encoding bitrates. As another example, when latency is higher, higher encoding bitrates may, in some cases, be considered more important than higher proportions of forward error correction. By contrast, in some cases, when latency is lower, higher proportions of forward error correction may, in some cases, be considered more important than higher encoding bitrates.

In some cases, transmission attribute prioritization logic may also vary depending on one or more protocols being employed for transmission of the data. For example, transmission attribute prioritization logic may specify that, when UDP protocol is employed, higher proportions of forward error correction may, in some cases, be preferred in comparison to higher encoding bitrates. As another example, when non-UDP protocols are employed, higher encoding bitrates may, in some cases, be preferred in comparison to higher proportions of forward error correction.

Transmission attribute prioritization logic employed by dynamic adjustment component 375 may be aggregated at any desired level. For example, different transmission attribute prioritization logic may be associated with different clients and/or different content items. Different transmission attribute prioritization logic may be applied, for example, at different times of day or different days of the year. Different transmission attribute prioritization logic may be applied, for example, based on various capabilities and geographic locations of the client 400 and/or of various different components of the content provider 300 that are employed in association with transmission of a particular content item to a particular client. The capabilities of the client may include, for example, processing capabilities, storage capabilities, communications capabilities, display and presentation capabilities and others.

Figure 4:
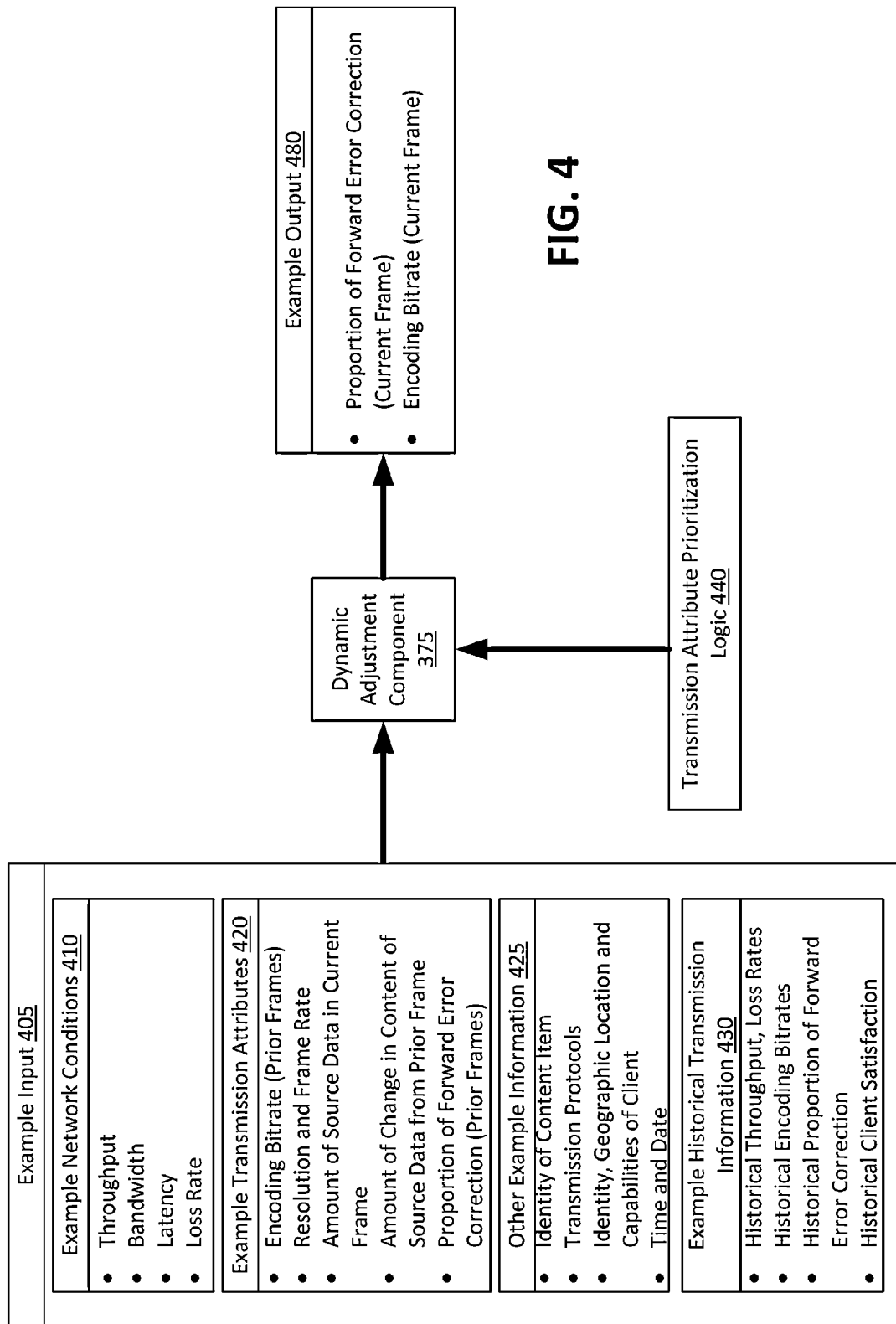
FIG. 4 is a diagram illustrating example logic for a dynamic adjustment component determination in accordance with the present disclosure.

FIG. 4 is a diagram illustrating example logic for a dynamic adjustment component determination in accordance with the present disclosure. As shown, FIG. 4 includes example input 405, which is employed by dynamic adjustment component 375 to at least in part determine example output 480. In the example of FIG. 4, example output 480 includes a proportion of forward error correction and an encoding bitrate to apply to a current frame of the transmitted data.

As also shown in FIG. 4, example input 405 includes example network conditions 410, example transmission attributes 420, other example information 425 and example historical transmission attributes 430. In particular, example network conditions 410 include throughput, bandwidth, a loss rate and latency. The example network conditions 410 may, for example, be associated with the transmission of one or more prior frames. Example transmission attributes 420 include an encoding bitrate applied to one or more prior frames, a resolution applied to one or more current and/or prior frames, a frame rate, an amount of source data in the current frame, an amount of change in content of source data from the prior frame and a proportion of forward error correction applied to one or more prior frames. Other example information 425 includes one or more transmission protocols employed to transit the content item, an identity of the content item, an identity, and geographic location and capabilities of the client and time and date. As set forth above, the capabilities of the client may include, for example, processing capabilities, storage capabilities, communications capabilities, display and presentation capabilities and others. Example historical transmission attributes 430 include historical throughput information, historical loss rates, historical proportions of forward error correction, historical encoding bitrates and historical client satisfaction information. It is noted that the contents of example input 480 are merely examples and that any portion of information included in example input 480 is not necessarily required by dynamic information component 375. Any combination of additional or alternative input information may also be employed in accordance with the disclosed techniques.

As shown in FIG. 4, dynamic adjustment component 375 may use example input 405 in combination with transmission attribute prioritization logic 440 to determine example output 480, which, in the example of FIG. 4, includes a proportion of forward error correction and an encoding bitrate to apply to a current frame of the transmitted data. Thus, in the example of FIG. 4, dynamic adjustment component 375 may employ some level of balancing between the applied proportion of forward error correction and the encoding bitrate. Some example techniques for balancing these and other transmission attributes are described in detail above. Transmission attribute prioritization logic 440 may include any of the example transmission attribute prioritization logic described above or any other additional or alternative logic. As set forth above, transmission attribute prioritization logic 440 may be, for example, stored in dynamic adjustment component 375 or otherwise accessible to or provided to dynamic adjustment component 375. As also set forth above, dynamic adjustment component determinations such as depicted in FIG. 4 may be made at any desired transmission interval. For example, in some cases, the applied proportion of forward error correction may be determined for adjustment on a frame-by-frame basis or in intervals of a plurality of frames. It is noted that example output 480 of FIG. 4 is merely an example and is non-limiting. In some cases, the proportion of forward error correction and/or the encoding bitrate may remain constant and may not be adjusted by dynamic adjustment component 375. Also, in some cases, any combination of additional or alternative transmission attributes and other items may be adjusted by dynamic adjustment component 375 in accordance with the disclosed techniques.

Figure 5:
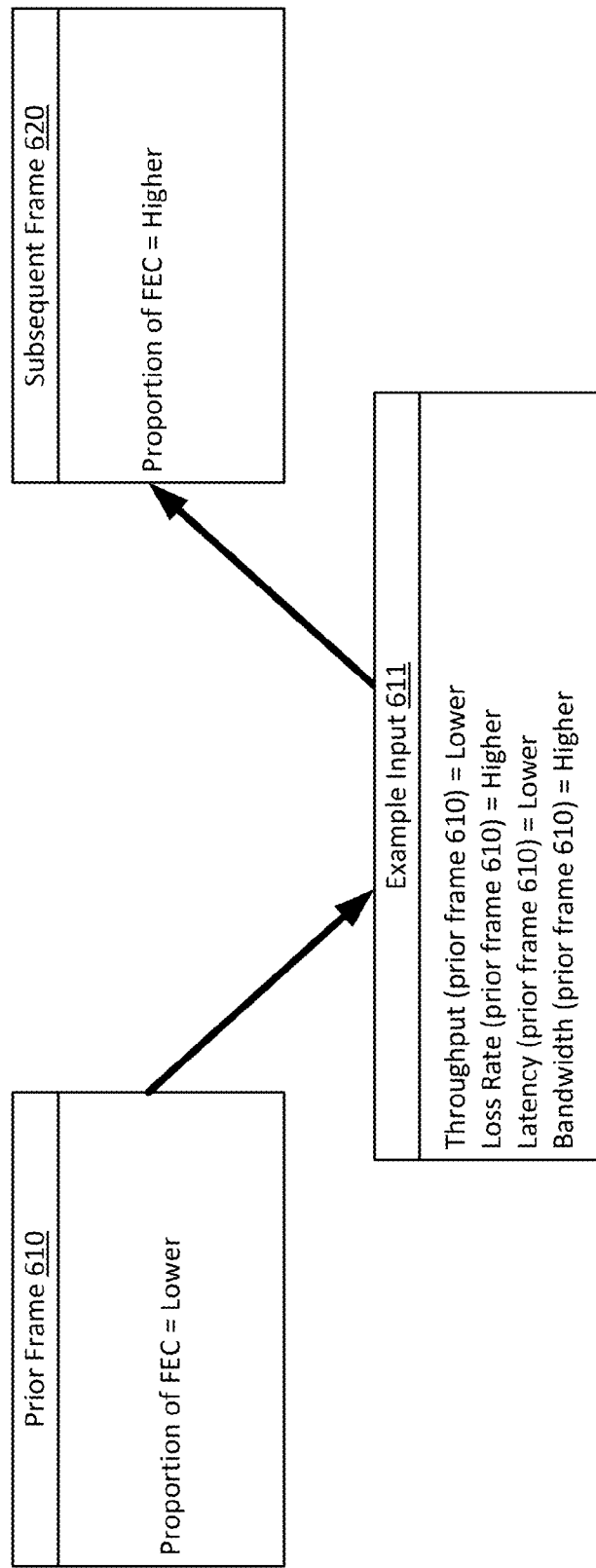
FIG. 5 is a diagram illustrating a first example forward error correction adjustment that may be used in some embodiments.
Figure 6:
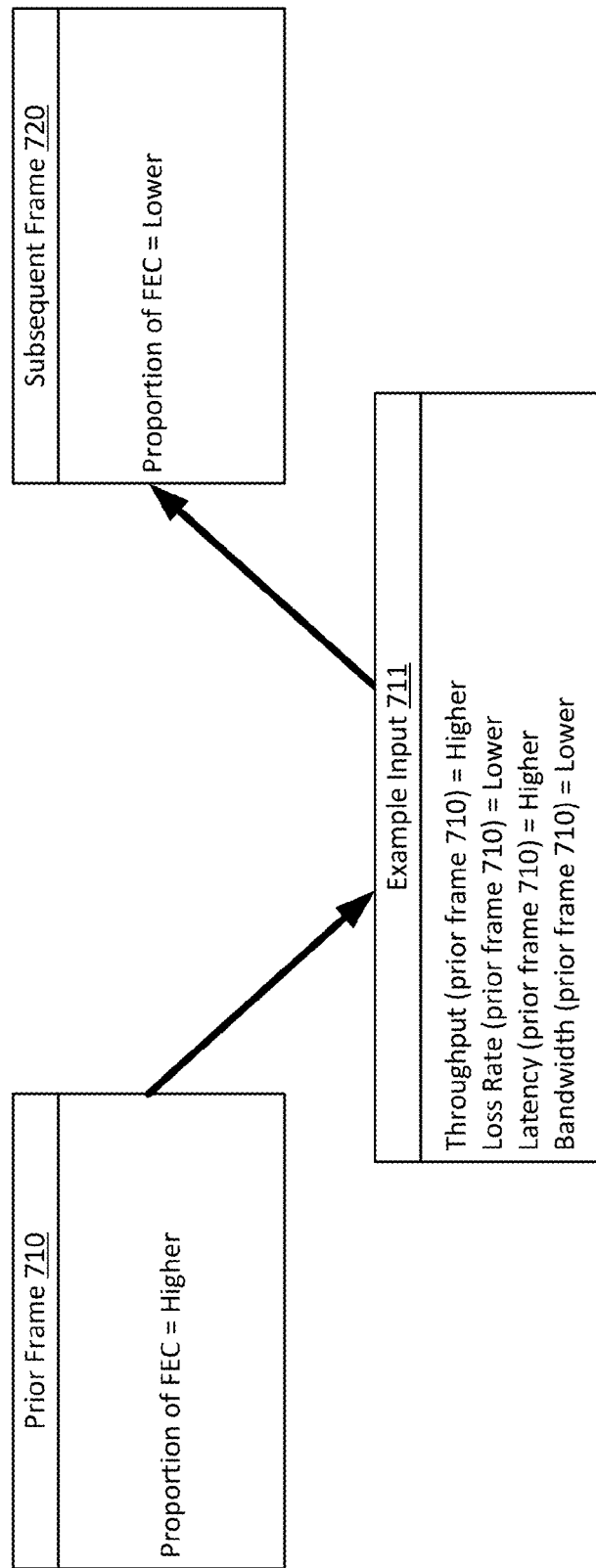
FIG. 6 is a diagram illustrating a second example forward error correction adjustment that may be used in some embodiments.
Figure 7:
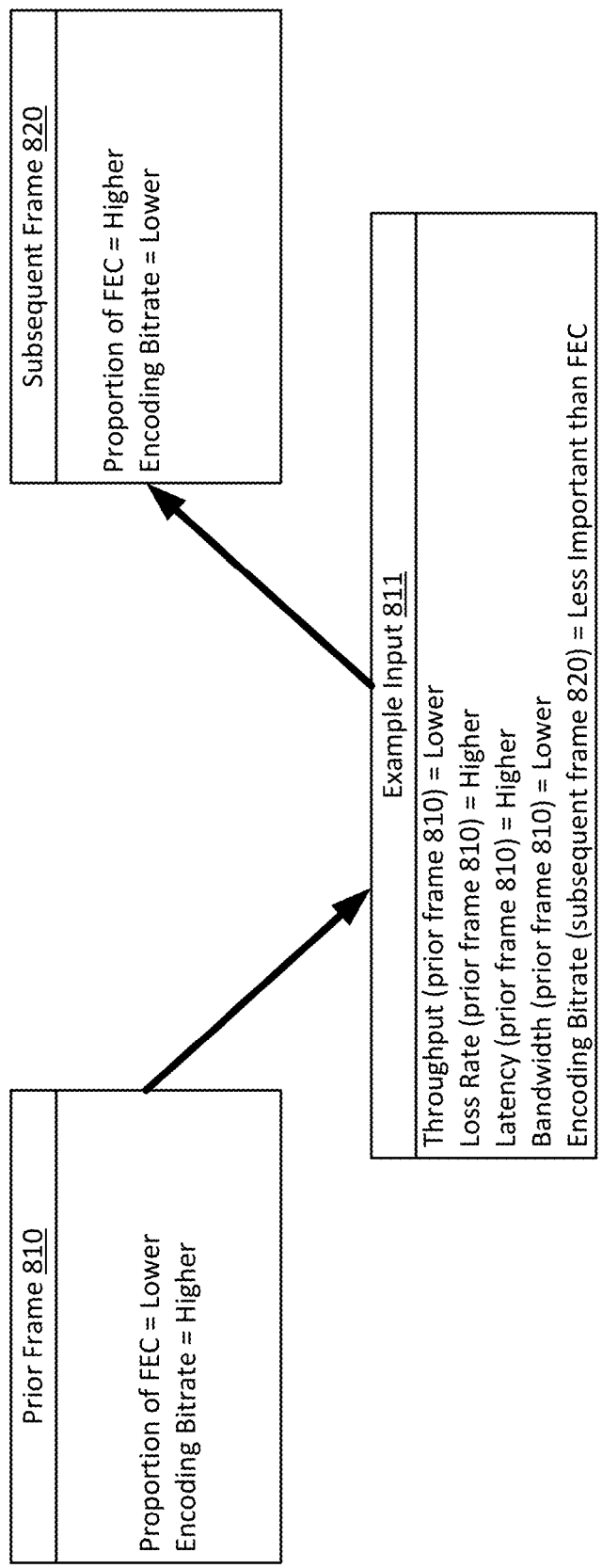
FIG. 7 is a diagram illustrating a third example forward error correction adjustment that may be used in some embodiments.

Diagrams of some example forward error correction adjustments are illustrated in FIGS. 5-7. In particular, FIG. 5 provides an example in which adjustment is performed based on four example input conditions, which are identified in FIG. 5 as throughput, loss rate, latency and bandwidth. As shown in FIG. 5, a content item generates a prior frame 610 and a subsequent frame 620. Prior frame 610 is transmitted from the content provider to the client prior to subsequent frame 620. In some cases, subsequent frame 620 may be the next frame transmitted immediately following prior frame 610. However, subsequent frame 620 is not required to immediately follow prior frame 610.

As described in detail above, the content provider may monitor the client to which a content item is transmitted and/or the network connection to the client in order to identify information associated with network conditions such as throughput, loss rate, latency and bandwidth. For example, before, during and after the transmission of prior frame 610, the content provider may obtain information associated with throughput, loss rate, latency and bandwidth corresponding to the transmission of prior frame 610. As shown in FIG. 5, example input 611 includes information associated with throughput, loss rate, latency and bandwidth corresponding to the transmission of prior frame 610 (as indicated by the words "prior frame 610" in parentheses in box 611). Additionally, as shown in the box corresponding to prior frame 610, a lower proportion of forward error correction was applied to transmit prior frame 610 to the client.

As illustrated in FIG. 5, the information included in example input box 611 is used to determine an adjusted proportion of forward error correction to apply to subsequent frame 620. Based on the factors indicated in example input 611, it is determined, in the example of FIG. 5, that the applied proportion of forward error correction should be adjusted to a higher level for subsequent frame 620. In particular, example input 611 indicates that a lower throughput and a higher loss rate were observed in association with the transmission of prior frame 610. Thus, a higher level of forward error correction may be employed in order to assist in improving the level of throughput and/or reducing the loss rate. Additionally, it is observed that latency is lower and bandwidth is higher. The lower latency and higher bandwidth both suggest a higher likelihood that the proportion of forward error correction may be increased without, for example, significant negative impact to other transmission attributes such as encoding bitrate.

It is noted that the determination to increase the applied proportion of forward error correction illustrated in subsequent frame 620 of FIG. 5 is merely an example and that such a determination is not necessarily required based on example input 611 in accordance with the disclosed techniques. For example, the particular transmission attribute logic employed by any given system as described above may, in some cases, result in a different determination to not adjust or to differently adjust the applied proportion of forward error correction. Similarly, the other determinations illustrated in subsequent frames 720 and 820 of FIGS. 6 and 7 respectively are examples and are not necessarily required based on the example inputs 711 and 811 shown in FIGS. 6 and 7 respectively.

Referring now to FIG. 6, another example forward error correction adjustment is shown. In particular, FIG. 6 illustrates a scenario in which a higher proportion of forward error correction was applied to prior frame 710. Additionally, in FIG. 6, different network conditions are observed in comparison to those shown in FIG. 5. Specifically, FIG. 6 indicates that a higher throughput and a lower loss rate were observed in association with the transmission of prior frame 710. Thus, because the observed throughput was higher and the observed loss rate was lower, it may be possible to reduce the applied proportion of forward error correction without significant negative impact to throughput and/or loss rate. Additionally, it is observed that latency is higher and bandwidth is lower. The higher latency and lower bandwidth both suggest a higher likelihood that redundant forward error correction bits from prior frame 710 could be used more efficiently by, for example, increasing the encoding bitrate to provide a better image quality. Accordingly, based on the factors indicated in example input 711, it is determined, in the example of FIG. 6, that the applied proportion of forward error correction should be adjusted to a lower level for subsequent frame 720.

Referring now to FIG. 7, another example forward error correction adjustment is shown. In particular, FIG. 7 illustrates a scenario in which a lower proportion of forward error correction and a higher encoding bitrate were applied to prior frame 810. Additionally, in FIG. 7, different network conditions are observed in comparison to those shown in FIG. 5 or 6. Specifically, example input box 811 of FIG. 7 indicates that a lower throughput was observed in combination with a higher loss rate, higher latency and a lower bandwidth in association with the transmission of prior frame 810. Thus, because observed throughput for prior frame 810 is lower and the observed loss rate is higher, it may be desirable to apply more forward error correction for subsequent frame 820. However, because observed latency is higher and the bandwidth is lower, the amount of bits available for additional forward error correction may be limited. Thus, it may be desirable to balance forward error correction against other transmission attributes such as the encoding bitrate. In particular, example input 811 also indicates that, for subsequent image 820, the encoding bitrate is determined to be less important than forward error correction. This determination may be made, for example, based on transmission attribute prioritization logic that is stored by or otherwise made available to dynamic adjustment component 375.

Thus, in the example of FIG. 7, because the encoding bitrate is less important than forward error correction, it may be determined that additional bits may be allocated to forward error correction as opposed to the encoding bitrate. Accordingly, in the example of FIG. 7, it is determined that the applied proportion of forward error correction should be adjusted to a higher level for subsequent frame 820. Additionally, because the encoding bitrate of the subsequent frame 820 is less important than forward error correction, FIG. 7 also indicates that the encoding bitrate of subsequent frame 820 is determined to be lower. It is once again noted that the examples of FIG. 5-7 merely illustrate some possible example manners in which some dynamic determinations may be made and that the determinations included in FIGS. 5-7 are not necessarily required based on the example input and logic associated with FIGS. 5-7.

In some other example cases, dynamic determinations may be made based on additional network conditions such as error rate, distortion rate and packet jitter. In some cases, increases in rates or occurrences of these additional network conditions may not be desirable and may be limited using techniques such as forward error correction. Accordingly, increases in these additional network conditions may, in some cases, cause higher proportions of forward error correction to be applied to subsequent frames, while decreases in these additional network conditions may, in some cases, cause lower proportions of forward error correction to be applied to subsequent frames.

Figure 8:
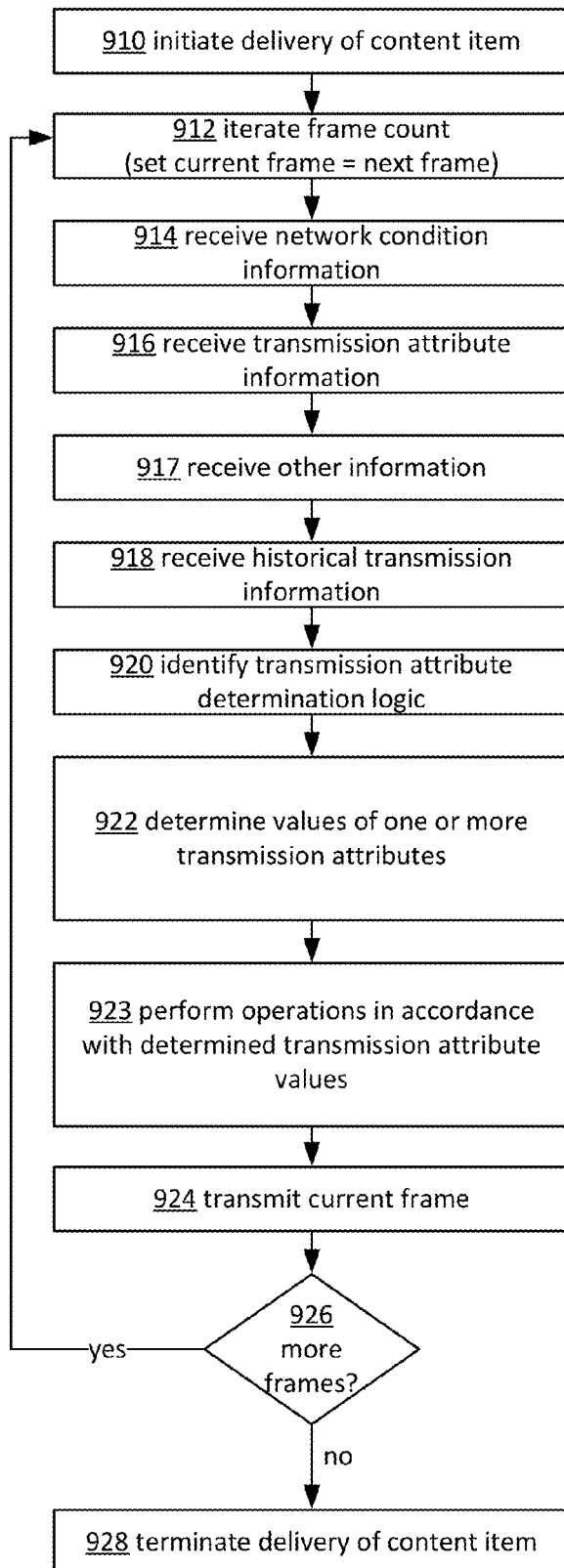
FIG. 8 is a flowchart depicting an example adaptive content transmission procedure in accordance with the present disclosure.

FIG. 8 is a flowchart depicting an example adaptive content transmission procedure in accordance with the present disclosure. At operation 910, a transmission of a content item such as a video game is initiated. As set forth above, the content item may, for example, be transmitted from a content provider to a client using an electronic network such as the Internet or another WAN or LAN network. The transmission may, for example, be initiated based upon a request or command from the client. As also set forth above, the content item may, for example, be transmitted using streaming content delivery technology.

At operation 912, a frame count is iterated such that a current frame is set to be a next frame. For example, upon a first performance of operation 912, a first transmitted frame of the content item may become the current frame. As another example, upon a second performance of operation 912, a second transmitted frame of the content item may become the current frame. It is noted that operation 912 is included for purposes of simplicity to clarify to the reader that operations in the process of FIG. 8 may be repeated for one or more transmitted frames. Operation 912 need not necessarily require any processing or computation by the content provider.

At operation 914, network condition information is received by, for example, dynamic adjustment component 375 of FIG. 3. As set forth above, the received network condition information may be associated with a connection from the content provider to the client. The received information may correspond to network conditions such as network throughput, a loss rate such as a packet loss rate, available network bandwidth, network latency, error rate, distortion rate, packet jitter and various other conditions. It is noted that the received network condition information may, in some cases, be associated with the transmission of one or more frames transmitted prior to the current frame. Thus, in some cases, network condition information may not be available or may be minimal upon the first performance of operation 914. However, an increased amount of network condition information may become available upon subsequent performances of operation 914. Various techniques for obtaining network condition information are set forth in detail above and are not repeated here.

At operation 916, transmission attribute information is received by, for example, dynamic adjustment component 375 of FIG. 3. As set forth above, the received transmission attribute information may be associated with transmission attributes such as a proportion of forward error correction applied to current and/or prior frames, an encoding bitrate of current and/or prior frames, a resolution of current and/or prior frames, a frame rate, information associated with an amount or complexity of source data being encoded in current and/or prior frames, an amount of change in the content of source data between one or more frames and other associated information.

At operation 917, other information is received including, for example, information identifying the client, information identifying one or more capabilities of the client, information identifying the content item, information identifying a geographic location of the client, a current or near-current time and date, information identifying one or more transmission protocols employed for transmission of the content item and others.

At operation 918, historical transmission information is received by, for example, dynamic adjustment component 375 of FIG. 3. As set forth above, the received historical transmission information may include, for example, historical associations between applied proportions of forward error correction, encoding bitrates, and other transmission attributes and resulting observed throughput, loss rates and other network conditions. The received historical transmission information may also include, for example, historical associations between client satisfaction and applied proportions of forward error correction, encoding bitrates and other transmission attributes.

It is once again noted that all or any portion of the information associated with operations 914, 916, 917 and 918 may be received at any appropriate intervals including, for example, a frame-by-frame interval or in intervals of a plurality of frames. As should be appreciated, different information may be obtained at different intervals with respect to one another. Thus, even if the one or more transmission attributes are adjusted for each transmitted frame, it is not necessarily required that all or any portion of operations 914, 916, 917 and 918 be repeated for each transmitted frame.

At operation 920, transmission attribute determination logic is identified by, for example, dynamic adjustment component 375 of FIG. 3. As set forth above, transmission attribute determination logic may, for example, describe priorities for determination of various transmission attributes with respect to the information received at operations 914, 916, 917 and 918. Such priorities may include, for example, instructions for balancing various transmission attributes with respect to one another. A number of examples of transmission attribute determination logic are described in detail above and are not repeated here. It is further noted that operation 920 need not necessarily be repeated for each frame being transmitted and, in some cases, may only be performed once.

At operation 922, values of one or more transmission attributes are determined for the current frame. For example, at operation 922, the values of one or more transmission attributes may be dynamically adjusted such that their value changes for the current frame relative to their values for one or more prior frames. Operation 922 may also include, for example, a determination to leave the values of one or more transmission attributes unchanged for the current frame relative to their values for one or more prior frames. The one or more determined transmission attribute values may include, for example, an applied proportion of forward error correction for the current frame, an encoding bitrate for the current frame, a resolution for the current frame, a frame rate and others. As set forth above, the transmission attribute values may, for example, be determined based at least in part on the attribute determination logic identified at operation 920 in combination with any or all of the information received at operations 914, 916, 917 and 918 and possibly additional or alternative information. For example, at operation 922, the values of one or more transmission attributes for the current frame may be determined and/or adjusted based on network conditions, transmission attributes and information associated with the transmission of one or more current and/or prior frames. Operation 922 may include, for example, a balancing of one or more transmission attributes relative to one another. For example, in some cases, increasing an applied proportion of forward error correction may result in decreasing of an encoding bitrate, a resolution and/or a frame rate. As another example, in some cases, decreasing an applied proportion of forward error correction may result in increasing of an encoding bitrate, a resolution and/or a frame rate. A number of other examples of techniques for determining the applied proportion of forward error correction and other transmission attribute values are described in detail above and are not repeated here.

It is once again noted that transmission attribute values may be determined at any appropriate interval including, for example, a frame-by-frame interval or in intervals of a plurality of frames. Thus, it is not necessarily required operation 922 be repeated for each transmitted frame. It is also noted that, in some cases, one or more transmission attributes may not be dynamically adjusted and may not be part of the determination performed at operation 922. For example, in some cases, the encoding bitrate may remain constant and, therefore, its value need not be determined at operation 922. As another example, in some cases, the applied proportion of forward error correction may remain constant and, therefore, its value need not be determined at operation 922.

Operation 922 may include determining one or more transmission attributes associated with transmission of video data and/or audio data. In particular, forward error correction and various other transmission attributes may be applied to and dynamically adjusted for video data and/or audio data using any or all of the techniques disclosed herein. The transmission attributes may be adjusted for video data and/or audio data on a frame-by-frame basis or at any other desired interval or rate. The terms content and content item, as used herein, may include both video data and/or audio data.

At operation 923, operations are performed in accordance with the transmission attributes values determined at operation 922. For example, at operation 923, the current frame may be encoded using a determined encoding bitrate and a determined proportion of forward error correction may be applied to the current frame. At operation 924, the current frame is transmitted to the client, which may display the transmitted frame.

At operation 926, it is determined whether there are any more frames remaining for transmission in association with the content item. If so, then the process returns to operation 912. If not, then the content item transmission is terminated at operation 928.

It is noted that, while some examples of the disclosed techniques described above may refer to streaming of content, the disclosed techniques are not limited to use with streaming technology. For example, the disclosed techniques may also be employed for downloading of files or other information over a network. Additionally, any of the disclosed techniques for adaptive content transmission may be employed in combination with such a download procedure. For example, forward error correction for a file download may be adjusted dynamically based upon any combination of network conditions, transmission attributes, historical information, transmission attribute prioritization logic and other information as set forth above. In some cases, file downloads may be performed using transmission protocols that may be considered less reliable such as UDP protocol. As set forth above, the use of a less reliable protocol may be desirable in some cases because it may, for example, reduce latency, reduce costs and/or increase bandwidth efficiency in comparison to more reliable protocols. However, file downloads may also be employed using more reliable protocols. Additionally, it is once again noted that the disclosed techniques are not limited to use with any particular communication protocols and may be employed with respect to both more reliable and less reliable protocols.

In some cases, one or more additional packet streams may be used for transmission of data in combination with various forward error correction techniques in order to, for example, assist in reduction of latency. To illustrate this concept, a first example will now be described in which ten packets may be transmitted over a network using ten streams with no forward error correction employed in association with the transmission. By contrast, in a second example, a twenty percent proportion of forward error correction may be applied to the ten packets to result in ten source packets and two redundant packets. The ten source packets and two redundant packets result in twelve total packets, which, in the second example, may be transmitted using twelve streams. In the second example, the receiving device may use only the first ten of the twelve packets to be received. The final two packets to be received may be discarded since they may not be required to satisfactorily replicate the transmitted data at the receiving device. Thus, by using additional streams, the second example may, in some cases, allow forward error correction to be applied with no or minimal additional latency experienced by the receiving device. These additional packet stream techniques may, in some cases, be particularly advantageous when used with more reliable protocols such as TCP. However, these additional packet stream techniques are not limited to use with any particular communication protocols and may be employed with respect to both more reliable and less reliable protocols.

In some cases, certain additional techniques may be applied to assist in reliable transmissions within a particular timeframe and/or sequence. In particular, certain transmitted data may sometimes be considered unnecessary or unimportant if not received within a particular timeframe and/or sequence relative to its transmission. For example, client input data such as state data transmitted from a client to a content provider may sometimes have minimal value if it is not received shortly after its transmission. In some cases, the client input data may be associated with a generation of one or more subsequent content item frames. In such cases, if the subsequent content item frames are generated and transmitted before the client input data is successfully received by the content provider, then the client input data may have little or no value to the content provider.

To assist in reliable transmission of data such as client input data, the transmitted data may, in some cases, include or otherwise be associated with an identifier such as a timestamp, a sequence identifier and the like. Such an identifier may indicate a fixed or relative time and/or sequence associated with the transmission of the data. If the data is not received within a certain time or position in a sequence, then the transmitted data may be ignored. Additionally, in some cases, certain portions of the transmitted data may be successfully received, while other portions of the transmitted data may not be successfully received due to, for example, packet losses or other conditions. In such cases, if the successfully received portions of the data are received within a certain time or position in a sequence, then the receiving entity may send a request for the transmitting entity to re-transmit the data. By contrast, if the successfully received portions of the data are not received within a certain time or position in a sequence, then the receiving entity may simply ignore the received data and/or not send a re-transmission request.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. One or more server compute nodes comprising:
one or more processors; and
one or more memories storing instructions that, upon execution by the one or more processors, cause the one or more server compute nodes to perform operations comprising:
receiving a command to initiate a streaming transmission of a video game over an electronic network to a client;
applying a first proportion of forward error correction to a first frame associated with the video game, wherein the first proportion of forward error correction corresponds to a ratio of a number of redundant bits associated with the first frame in comparison to a number of source bits associated with the first frame;
transmitting the first frame to the client over the electronic network as part of the streaming transmission of the video game;
receiving information corresponding to at least one of a throughput, a bandwidth, a loss rate or a latency associated with the transmitting of the first frame;
adjusting, based at least in part on the information, application of forward error correction to the streaming transmission of the video game whereby different proportions of forward error correction are applied to different frames within the streaming transmission of the video game, wherein the adjusting comprises:
determining, based at least in part on the information, a second proportion of forward error correction for application to a second frame associated with the video game, wherein the second proportion is different from the first proportion, wherein the second proportion of forward error correction corresponds to a ratio of a number of redundant bits associated with the second frame in comparison to a number of source bits associated with the second frame; and
applying the second proportion of forward error correction to the second frame; and
transmitting the second frame to the client over the electronic network as part of the streaming transmission of the video game.

2. The one or more compute nodes of claim 1, wherein the second proportion of forward error correction is also determined based at least in part on at least one of an encoding bitrate, a frame rate or a resolution associated with the second frame.

3. The one or more compute nodes of claim 1, wherein at least one of an encoding bitrate, a frame rate or a resolution associated with the second frame are determined based at least in part on the second proportion of forward error correction.

4. The one or more compute nodes of claim 1, wherein user datagram protocol is employed to at least in part perform the streaming transmission of the video game.

5. A computer-implemented method executed by one or more server compute nodes for streaming transmission of a video game over an electronic network to a client comprising:

receiving a command to initiate the streaming transmission of the video game over the electronic network to the client;

applying a first proportion of forward error correction to a first frame associated with the video game, wherein the first proportion of forward error correction corresponds to a ratio of a number of redundant bits associated with the first frame in comparison to a number of source bits associated with the first frame;

transmitting the first frame to the client over the electronic network as part of the streaming transmission of the video game;

receiving information corresponding to at least one of a throughput, a bandwidth, a loss rate or a latency associated with the transmitting of the first frame;

adjusting, based at least in part on the information, application of forward error correction to the streaming transmission of the video game whereby different proportions of forward error correction are applied to different frames within the streaming transmission of the video game, wherein the adjusting comprises:

determining, based at least in part on the information, a second proportion of forward error correction for application to a second frame associated with the video game, wherein the second proportion is different from the first proportion, wherein the second proportion of forward error correction corresponds to a ratio of a number of redundant bits associated with the second frame in comparison to a number of source bits associated with the second frame; and applying the second proportion of forward error correction to the second frame; and transmitting the second frame to the client over the electronic network as part of the streaming transmission of the video game.

6. The computer-implemented method of claim 5, wherein the second proportion of forward error correction is also determined based at least in part on at least one of an encoding bitrate, a frame rate or a resolution associated with the second frame.

7. The computer-implemented method of claim 5, wherein at least one of an encoding bitrate, a frame rate or a resolution associated with the second frame are determined based at least in part on the second proportion of forward error correction.

8. The computer-implemented method of claim 5, wherein the information further corresponds to at least one of error rate, distortion rate, or packet jitter.

9. The computer-implemented method of claim 5, wherein an encoding bitrate of the second frame is decreased relative to an encoding bitrate of the first frame based at least in part on a determination that the second proportion of forward error correction is greater than the first proportion of forward error correction.

10. The computer-implemented method of claim 5, wherein the streaming transmission of the video game is performed as part of a file download procedure.

11. The computer-implemented method of claim 5, wherein the second proportion of forward error correction is also determined based at least in part on at least one of an identity of the video game, an identity of the client, a location of the client, one or more capabilities of the client or a transmission protocol associated with the streaming transmission of the video game.

12. The computer-implemented method of claim 5, wherein the second frame immediately follows the first frame.

13. The computer-implemented method of claim 5, wherein the second frame does not immediately follow the first frame.

14. The computer-implemented method of claim 5, wherein the first and second frame comprise video content.

15. The computer-implemented method of claim 5, wherein the first and second frame comprise audio content.

16. One or more non-transitory computer-readable storage media having stored thereon instructions that, upon execution on one or more server compute nodes, cause the one or more server compute nodes to perform operations comprising:

receiving a command to initiate a streaming transmission of a video game over an electronic network to a client;

applying a first proportion of forward error correction to a first frame associated with the video game, wherein the first proportion of forward error correction corresponds to a ratio of a number of redundant bits associated with the first frame in comparison to a number of source bits associated with the first frame;

transmitting the first frame to the client over the electronic network as part of the streaming transmission of the video game;

receiving information corresponding to at least one of a throughput, a bandwidth, a loss rate or a latency associated with the transmitting of the first frame;

adjusting, based at least in part on the information, application of forward error correction to the streaming transmission of the video game whereby different proportions of forward error correction are applied to different frames within the streaming transmission of the video game, wherein the adjusting comprises:

determining, based at least in part on the information, a second proportion of forward error correction for application to a second frame associated with the video game, wherein the second proportion is different from the first proportion, wherein the second proportion of forward error correction corresponds to a ratio of a number of redundant bits associated with the second frame in comparison to a number of source bits associated with the second frame; and applying the second proportion of forward error correction to the second frame; and transmitting the second frame to the client over the electronic network as part of the streaming transmission of the video game.

17. The one or more non-transitory computer-readable storage media of claim 16, wherein the second proportion of forward error correction is also determined based at least in part on at least one of an encoding bitrate, a frame rate or a resolution associated with the second frame.

18. The one or more non-transitory computer-readable storage media of claim 16, wherein at least one of an encoding bitrate, a frame rate or a resolution associated with the second frame are determined based at least in part on the second proportion of forward error correction.

19. The one or more non-transitory computer-readable storage media of claim 16, wherein the streaming transmission of the video game is performed as part of a file download procedure.

20. The one or more non-transitory computer-readable storage media of claim 16, wherein the second proportion of forward error correction is also determined based at least in part on at least one of an amount of source data associated with the second frame or an amount of change between a content of the source data associated with the second frame and a content of source data associated with the first frame.

21. The one or more non-transitory computer-readable storage media of claim 16, wherein the second proportion of forward error correction is also determined based at least in part on at least one of an identity of the video game, an identity of the client, a location of the client, one or more capabilities of the client or a transmission protocol associated with the streaming transmission of the video game.

22. The one or more non-transitory computer-readable storage media of claim 16, wherein the second proportion of forward error correction is also determined based at least in part on duration of playing of the video game in association with a prior transmission of the video game.

23. The one or more non-transitory computer-readable storage media of claim 16, wherein the second frame immediately follows the first frame.

24. The one or more non-transitory computer-readable storage media of claim 16, wherein the second frame does not immediately follow the first frame.

25. The one or more non-transitory computer-readable storage media of claim 16, wherein the streaming transmission of the video game includes a transmission of packets across a total number of streams, and wherein data transmitted across only a first portion of the total number of streams is required in order to satisfactorily replicate transmitted source data at the client.

26. The one or more non-transitory computer-readable storage media of claim 16, wherein the information further corresponds to at least one of error rate, distortion rate or packet jitter.

\* \* \* \* \*